(12) United States Patent
Jain et al.

(10) Patent No.: US 8,296,701 B2
(45) Date of Patent: Oct. 23, 2012

(54) METHOD FOR DESIGNING A SEMICONDUCTOR DEVICE BASED ON LEAKAGE CURRENT ESTIMATION

(75) Inventors: Palkesh Jain, Bangalore (IN); Ajoy Mandal, Bangalore (IN); Arvind Nembili Veeravalli, Bangalore (IN); Venkatasubramanyam Visvanathan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 58 days.

(21) Appl. No.: 12/979,393

(22) Filed: Dec. 28, 2010

(65) Prior Publication Data

US 2012/0167031 A1    Jun. 28, 2012

(51) Int. Cl.
*G06F 17/50* (2006.01)

(52) U.S. Cl. ........... 716/106; 716/111; 716/136; 703/15

(58) Field of Classification Search .................. 716/106, 716/111, 136; 703/15
See application file for complete search history.

(56) References Cited

U.S. PATENT DOCUMENTS

| | | | | |
|---|---|---|---|---|
| 5,521,834 A * | 5/1996 | Crafts et al. | ................. | 716/108 |
| 6,076,048 A * | 6/2000 | Gunther et al. | ................. | 702/51 |
| 6,687,883 B2 * | 2/2004 | Cohn et al. | ................... | 716/109 |
| 7,137,080 B2 * | 11/2006 | Acar et al. | ..................... | 716/109 |
| 7,149,674 B1 * | 12/2006 | Sirichotiyakul et al. | ........ | 703/15 |
| 7,230,812 B2 * | 6/2007 | Alam et al. | ................... | 361/93.1 |
| 7,312,109 B2 * | 12/2007 | Madurawe | ..................... | 438/138 |
| 2002/0116440 A1 * | 8/2002 | Cohn et al. | .................... | 709/105 |
| 2003/0000422 A1 * | 1/2003 | Hase et al. | .............. | 106/287.19 |
| 2005/0044515 A1 * | 2/2005 | Acar et al. | ......................... | 716/5 |
| 2005/0181546 A1 * | 8/2005 | Madurawe | ..................... | 438/132 |
| 2010/0277461 A1 * | 11/2010 | Ruckmongathan | ........... | 345/213 |
| 2011/0054856 A1 * | 3/2011 | Joshi et al. | ........................ | 703/2 |

\* cited by examiner

*Primary Examiner* — Phallaka Kik
(74) *Attorney, Agent, or Firm* — John R. Pessetto; W. James Brady; Frederick J. Telecky, Jr.

(57) ABSTRACT

A method of designing a semiconductor device includes preparing a first design for a semiconductor device and estimating leakage current for the first design. The method also includes determining a leakage current cumulative distribution function (CDF) for the first design. The method further includes preparing a second design for the semiconductor device based on determination of the leakage current CDF for the first design. Further, the method includes estimating leakage current for the second design. The method also includes determining a leakage current CDF for the second design in accordance to the determination of the leakage current CDF for the first design. Moreover, the method includes selecting one of the first design and the second design based on a comparison of the leakage current CDF for the first design and the leakage CDF for the second design.

20 Claims, 8 Drawing Sheets

METHOD FOR DESIGNING A SEMICONDUCTOR DEVICE BASED ON LEAKAGE CURRENT ESTIMATION

TECHNICAL FIELD

Embodiments of the disclosure relate to a method of designing a semiconductor device based on leakage current estimation.

BACKGROUND

A system-on-chip (SoC) includes several transistors. Two types of variations, for example global variations and local variations, leads to leakage in the transistors and hence to leakage in the SoC. The global variations are inter-die variations and affect integrated circuit devices by causing differences in properties of circuit elements fabricated on different chips (dies), albeit from the same wafer, on different wafers, or on different batches of wafers. The local variations, which are intra-die variations, are differences in electrical properties that affect components of the integrated circuits fabricated on one die. The local variations include systematic variations and random variations. The systematic variations occur due to variation in strength of an instrument used for manufacturing the transistors. The random variations occur due to variation in number of atoms that enter a channel while formation of the channel of the transistors. It is desired to estimate the leakage of the SoC to manage and reduce the leakage, and in turn to improve power management of the SoC.

An existing technique for estimation of the leakage of the SoC includes corner based estimation technique. The manufacturing of the transistors can result in three types of transistors, for example weak transistors, normal transistors and strong transistors, due to the global variations. The corner based estimation technique includes identifying a strong leakage corner for a strong transistor of the SoC. The strong leakage corner can be defined as a process corner accounting for worst case leakage of the strong transistor. Computation of the leakage for various transistors of the SoC is then performed for the strong leakage corner. The leakages of the cells can then be summed to determine the leakage of the SoC. However, the leakage of one transistor is independent of that of another transistor and hence, computation of the leakage using the strong leakage corner leads to a pessimistic estimation. Moreover, local variations are not considered which may affect leakage of the SoC to a certain extent.

Another existing technique for estimation of the leakage of the SoC includes a statistical analysis process of the SoC. The statistical analysis process includes performing several simulations which makes the statistical analysis process computation intensive and in turn leads to wastage of resources. Hence, there is a need for a method to design a semiconductor device based on leakage current estimation that considers both local variations and global variations.

SUMMARY

An example of designing a semiconductor device includes preparing a first design for the semiconductor device. The method also includes estimating leakage current for the first design. The method further includes determining a leakage current cumulative distribution function (CDF) for the first design by calculating a plurality of mean shifts of leakage current and a sum of the plurality of mean shifts, each mean shift of the plurality of mean shifts around a single global process corner and a single operating voltage; by calculating the leakage current at a plurality of global process points and at a plurality of operating voltages to obtain a global leakage current CDF; and by shifting each leakage current on the global leakage current CDF by the sum of the plurality of mean shifts to obtain the leakage current CDF for the first design considering both global variations and local variations and for the plurality of operating voltages. Further, the method includes preparing a second design for the semiconductor device based on determination of the leakage current CDF for the first design and estimating leakage current for the second design. The method also includes determining a leakage current CDF for the second design in accordance to the determination of the leakage current CDF for the first design. Moreover, the method includes selecting one of the first design and the second design based on a comparison of the leakage current CDF for the first design and the leakage CDF for the second design.

Another example of a method of designing a semiconductor device includes preparing a first design for the semiconductor device and estimating leakage current for the first design. The method also includes determining a leakage current cumulative distribution function (CDF) for the first design by calculating a plurality of mean shifts of leakage current, each mean shift of the plurality of mean shifts around a plurality of global process corners and a plurality of operating voltages to obtain a local variation mean shift; by calculating the leakage current at a plurality of global process points and at the plurality of operating voltages to obtain a global leakage current CDF; and by shifting each leakage current on the global leakage current CDF by the local variation mean shift to obtain the leakage current CDF for the first design considering both global variations and local variations and for the plurality of operating voltages. The method further includes preparing a second design for the semiconductor device based on determination of the leakage current CDF for the first design and estimating leakage current for the second design. Further, the method includes determining a leakage current CDF for the second design in accordance to the determination of the leakage current CDF for the first design. Moreover, the method includes selecting one of the first design and the second design based on a comparison of the leakage current CDF for the first design and the leakage CDF for the second design.

An example of a method of estimating effects of local variations on leakage current for a semiconductor device includes statistically estimating a plurality of mean shifts of leakage current around a single global process corner and a single operating voltage. The method also includes calculating a sum of the plurality of mean shifts to estimate a mean shift of the leakage current due to the local variations, the local variations for the leakage current being determined based on a mean around the single global process corner.

BRIEF DESCRIPTION OF THE VIEWS OF DRAWINGS

The drawings illustrate various embodiments and explain certain aspects and advantages of the invention. They are illustrative only and are not to be taken as limiting the invention in any way. Like reference numerals are used in the various drawings to refer to like elements.

DETAILED DESCRIPTION OF THE EMBODIMENTS

Figure 1:
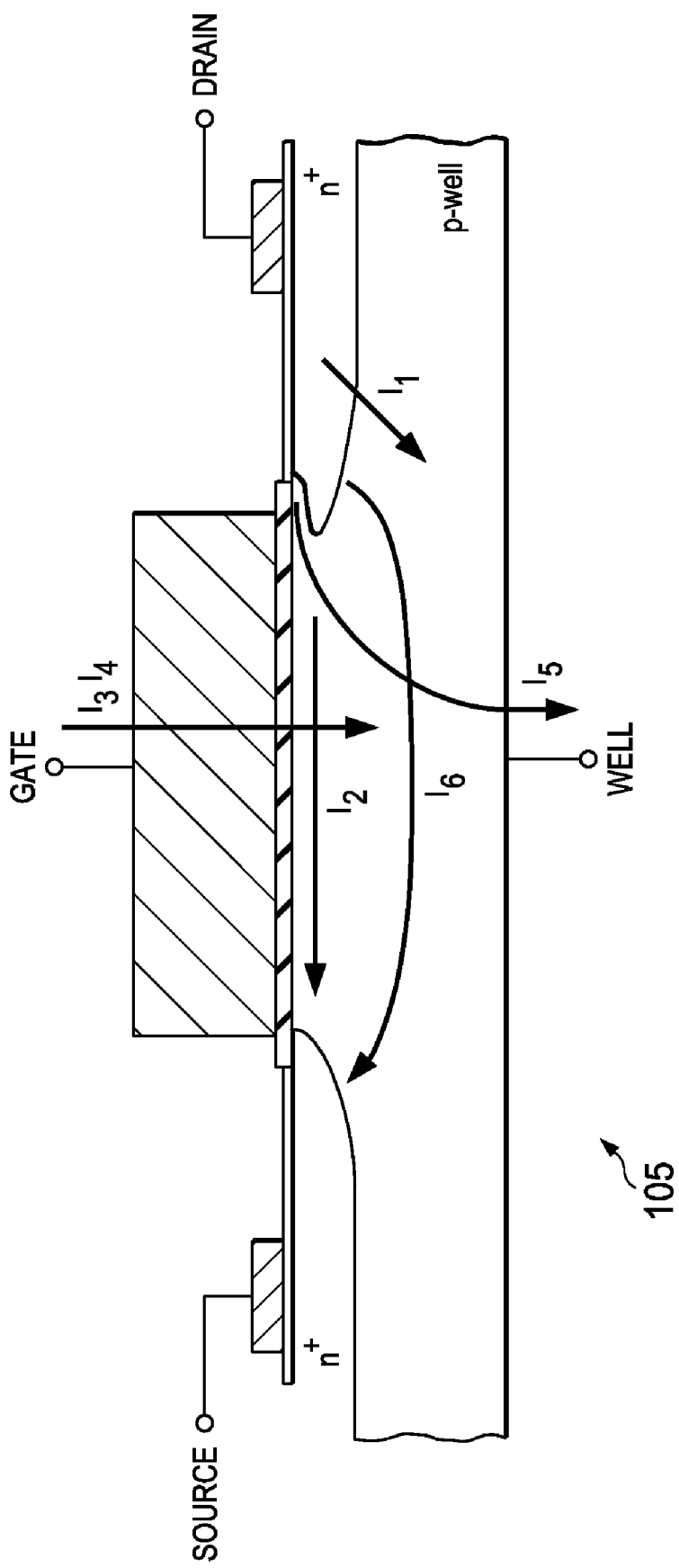
FIG. 1 is an exemplary illustration of a transistor and leakage associated with the transistor, in accordance with one embodiment.

FIG. 1 is an exemplary illustration of a transistor 105 and leakage associated with the transistor 105. The leakage is represented as various leakage currents, for example a leakage current I1 to a leakage current I6. The leakage current I1 is present due to reverse bias pn junction leakage. A leakage current I2 is present due to subthreshold leakage. A leakage current I3 is present due to oxide tunneling. A leakage current I4 is a gate current present due to hot-carrier injection. A leakage current I5 is present due to gate-induced drain leakage (GIDL). The leakage current I6 is a channel punch through current.

As technology is down scaling, power consumption due to the leakage is increasing as compared to power consumption happening due to switching of the transistor 105. The leakage current I2 is an off state leakage for current that flows between source and drain of the transistor 105 when the transistor 105 has gate-source voltage below a certain threshold. The leakage current I2 is becoming a dominant component of the leakage with the downscaling. The subthreshold leakage is sensitive to process variations and depends on threshold voltage of the transistor 105 as shown in equation (1).

$$I2 = ae^{k \times f(V_t, L)} \quad (1)$$

where a is a function of dimensions of the transistor 105 and other technology constants, k depends on geometry of the transistor 105, $V_t$ is the threshold voltage of the transistor 105, L is length of the transistor 105, and $f(V_t, L)$ is a linear function of $V_t$ and L.

Hence, it is desired to estimate the leakage to manage power.

Figure 2:
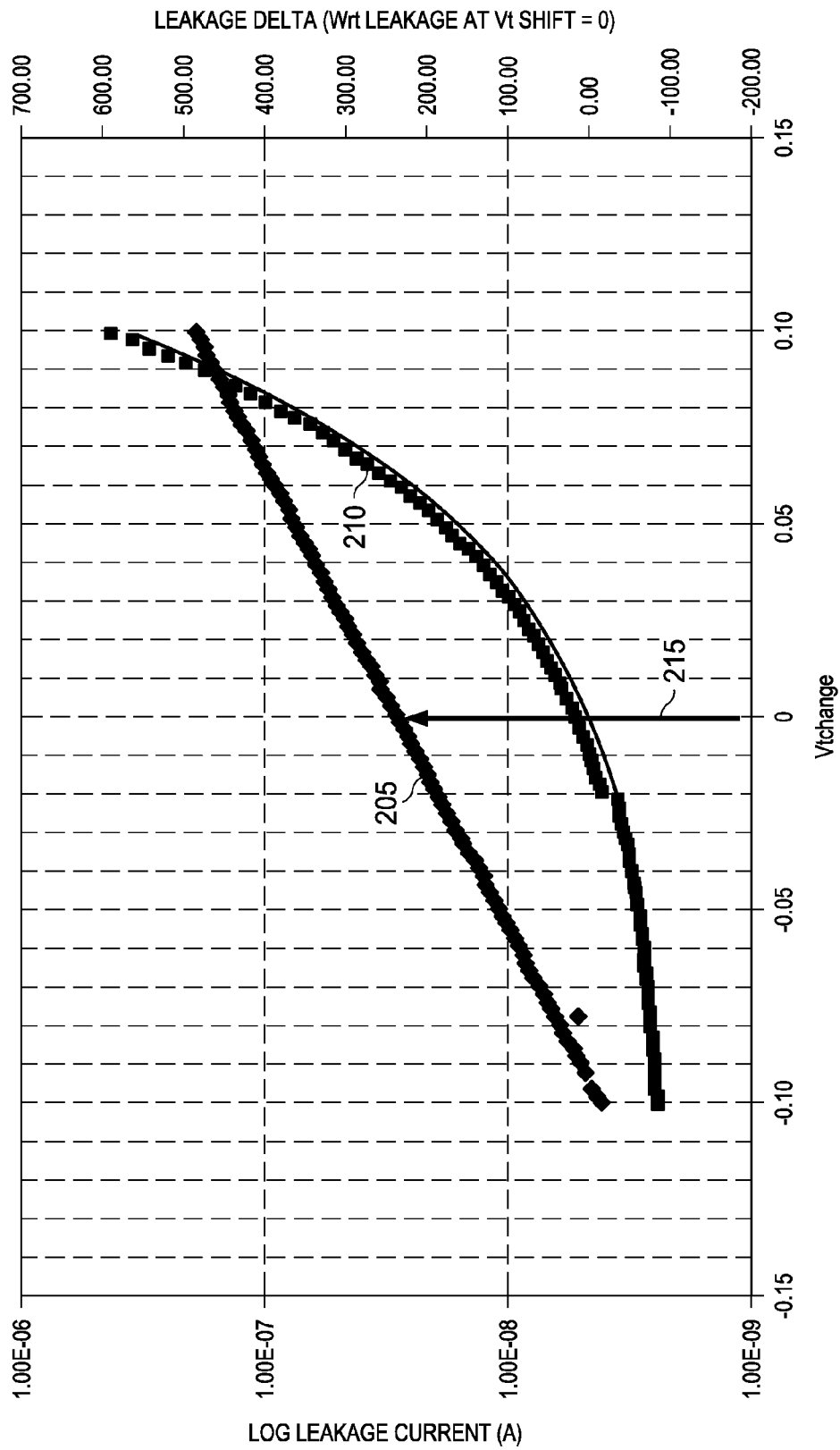
FIG. 2 illustrates sensitivities of device leakage to process parameters, in accordance with one embodiment.

FIG. 2 illustrates sensitivities of device leakage to process parameters. More specifically, FIG. 2 illustrates a waveform 205 corresponding to leakage current versus a waveform 210 corresponding to leakage delta as a function of threshold voltage $V_t$, with the subthreshold leakage (or off state leakage) depending strongly on $V_t$. The leakage delta with respect to the leakage at change in $V_t=0$, illustrated with a waveform 215, increases exponentially with the change in $V_t$. FIG. 2 thus illustrates that the subthreshold leakage varies exponentially with transistor length (L) and $V_t$. As semiconductor devices are scaled down, supply voltage is lowered to reduce power requirements, which in turn further scales down $V_t$ for maintaining a reasonable gate over drive. To a second order, Vt depends on L due to drain induced barrier lowering (DIBL). DIBL refers to reduction of $V_t$ of the transistor, for example the transistor 105, at higher drain voltages and other effects.

Based on equation (1), it becomes apparent that the impact of local variations on device leakage is significant, and therefore, should be considered for estimates of leakage for a particular design. Different cells, for example a NAND gate and an inverter, have different sensitivities to local variations, thus the consideration of local variations is non-trivial to solve through a single global process corner. A process corner refers to scope of parameter variations within which an integrated circuit applied to a wafer must function properly for a particular design. On the other hand, a statistical analysis is overly demanding in terms of computation time, complexity, and infrastructure cost. In view of the above, the considering of local variations in system-on-chip (SoC) level power-per-formance trade-offs is essential. The tradeoff analysis requires arriving at cumulative distribution functions (CDFs) for performance and leakage simultaneously. A CDF describes a statistical distribution which has a value, at each possible outcome, of probability of having a leakage current outcome or a lower leakage current outcome.

The method according to an embodiment of the present disclosure incorporates the impact of local variations in leakage estimates with a characterization of mean shift in leakage due to mismatch around a global process corner. As a result, there is no analysis overhead at the SoC level since mean shifts of standard cells alone can be used to compute worst case SoC leakage. According to another aspect, the present disclosure provides a framework for doing statistical leakage-performance tradeoffs at the SoC level. The framework can be enabled through accurate CDF determination of the SoC leakage and enables tradeoffs of leakage and performance based on relationships between respective determined CDFs.

Thus, mismatch impact analysis proceeds from device level to the SoC level. In an SoC, there are a multitude of independent leakage distributions corresponding to each device of the SoC.

According to Lyapunov's extension to central limit theorem, summation of a plurality of uncorrelated random variables tend to follow a Gaussian distribution, with mean and sigma represented as in equation (2) given below:

$$\mu_{sum} = \sum_{i=1}^{n} \mu_i; \quad \sigma_{sum} = \sqrt{\sum_{i=1}^{n} \sigma_i^2} \quad (2)$$

where $\sigma_i$ and $\mu_i$ are, respectively, standard deviation (sigma) and mean (mu) of n random variables.

Applying equation (2) for Lyapunov's extension to the leakage, it has been determined that the mean shift of the SoC leakage due to local variations equals the sum of the mean shifts of device leakage characterized around the global process corner. Mean of the SoC leakage increases linearly with number of devices, whereas the sigma increases sub-linearly as the square root of sum of sigma is squared. In terms of σ/μ, since a typical SoC includes multiple devices, σ/μ A shrinks significantly, allowing the leakage analysis to ignore the impact individual device σ on overall SoC leakage.

Figure 3:
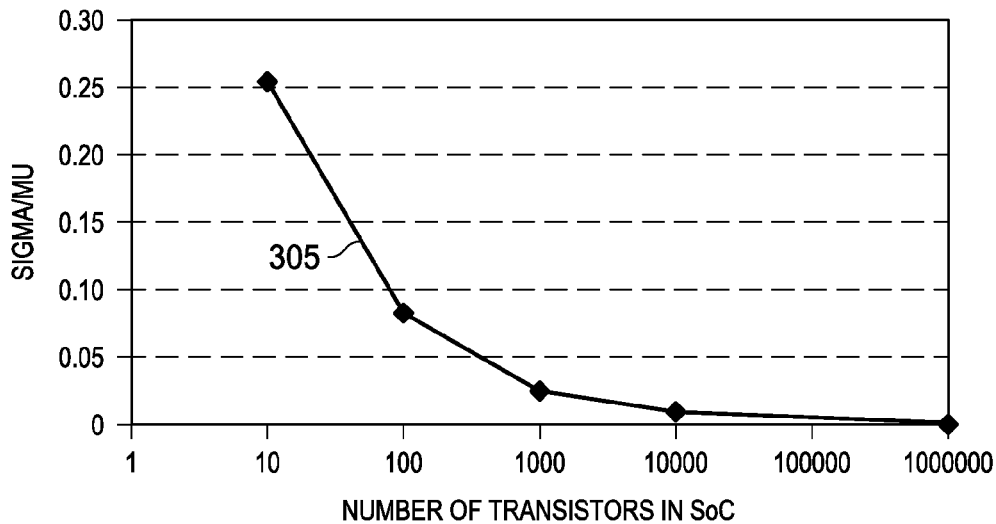
FIG. 3 illustrates standard deviation to mean for system-on-chip (SoC) leakage distribution as a function of number of transistors, in accordance with one embodiment.

FIG. 3 illustrates the sigma/mu (σ/μ) for SoC leakage distribution as a function of number of transistors. To verify assumptions on σ/μ A shrinking, an SoC scenario for FIG. 3 is mimicked with a collection of transistors of various widths being chosen and with a mean mismatch (MM) analysis being done around a selected global 3-sigma corner. A graph 305 in FIG. 3 illustrates σ/μ A of the SoC leakage distribution and dependency on a number of components. The SoC scenario confirms that σ/μ A falls as 1/sqrt(n). For an SoC with over a million components, σ/μ A becomes negligible, thereby quantifying the worst case leakage based just on the mean (μ).

Figure 4:
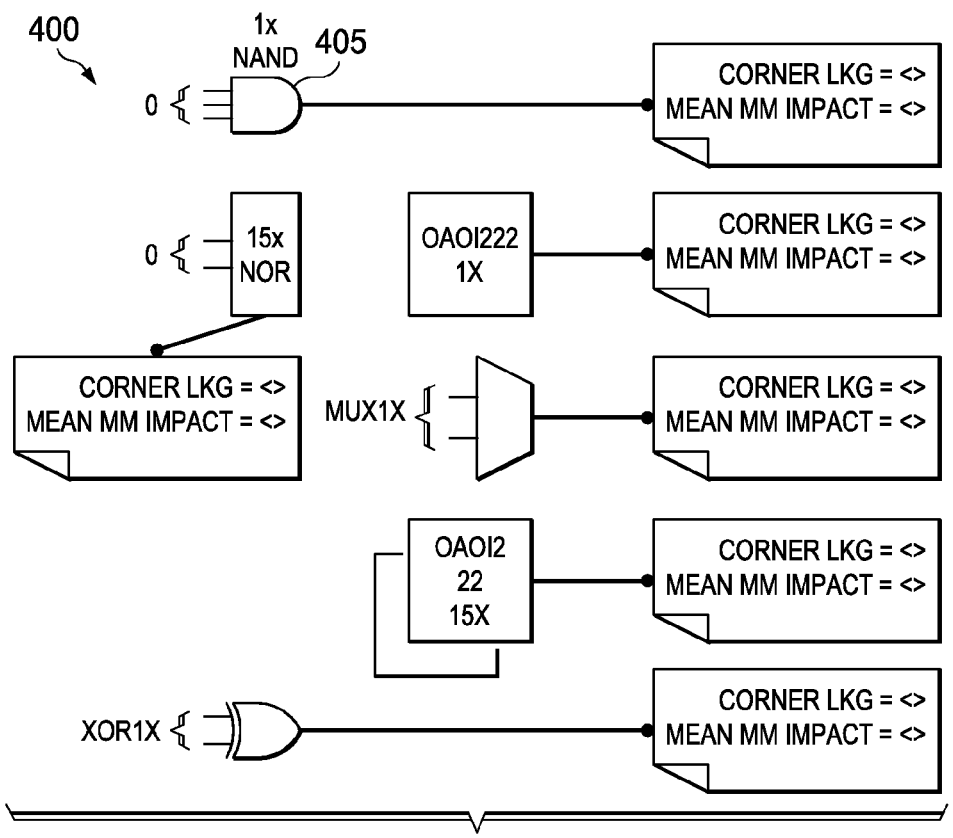
FIG. 4 illustrates an exemplary cell library, in accordance with one embodiment.
Figure 5:
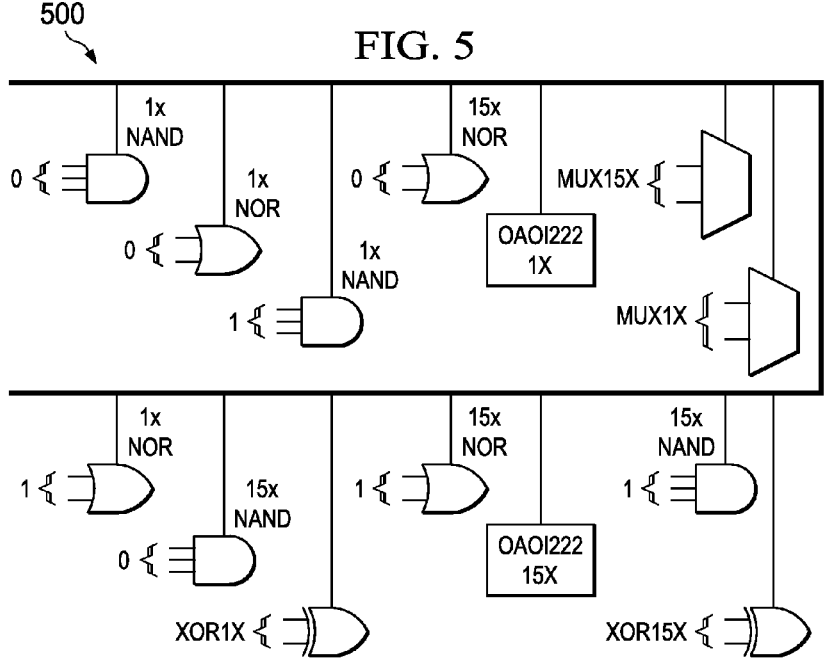
FIG. 5 illustrates an exemplary tile, in accordance with one embodiment.

A test case at the SoC level is described in conjunction with FIG. 4 and FIG. 5.

FIG. 4 illustrates an exemplary cell library 400, each cell characterized by corner leakage and MM impact. In one example, the cell library 400 includes 1×NAND gate 405 and the corner leakage (1 kg) and the MM impact is included for the 1×NAND gate 405. Similarly, other cells in the cell library 400 are characterized by corner leakage and MM impact. The cells in the cell library 400 can also be characterized at different input states for which leakage and MM impact can vary.

FIG. 5 illustrates an exemplary tile 500 including a conglomeration of various cells from the cell library, for example the cell library 400. A tile can be defined as a group of cells placed in a row and column order. A comparison is made of (1) the 3-sigma number resulting from a statistical analysis of local variations done by simulations, for example Monte Carlo simulations, run on the SoC including approximately 100,000 transistors with (2) added mean impact of the cells where the number of cells is a reduced sample set of approximately 1500 cells. The comparison is illustrated in FIG. 6.

Figure 6:
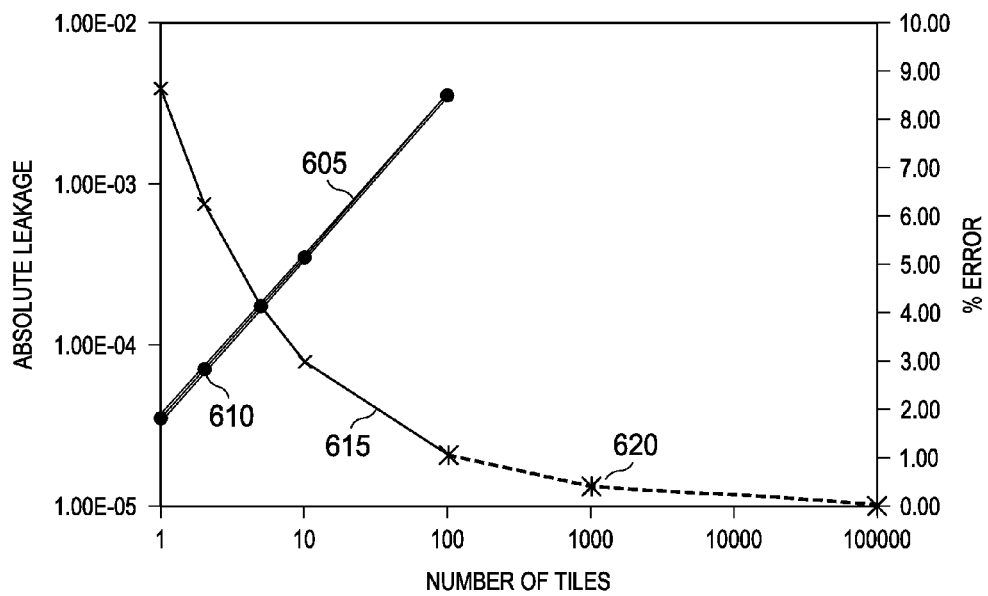
FIG. 6 is a graph illustrating percentage estimation error for a predicted worst case leakage compared to a statistical analysis, in accordance with one embodiment.

FIG. 6 is a graph illustrating percentage estimation error for a predicted worst case leakage compared to the statistical analysis. More specifically, FIG. 6 shows an SoC level comparison of the method according to an embodiment with an exemplary 1000 local variation Monte Carlo simulation. The axes include absolute leakage, number of tiles, and % error. The waveforms include a waveform 605 corresponding to global leakage, a waveform 610 corresponding to mean leakage, and a waveform 615 corresponding to the mean+3-sigma estimate of local variations. The mean leakage can be defined as added mean impact for approximately 1500 of the cells. The mean+3-sigma estimate of local variations is based on the Monte Carlo simulation of the local variations. The predicted worst case leakage and actual leakage (determined from the statistical analysis) are determined to be approximately similar. An estimation error is determined from equation (3) to follow the sigma/mu relationship which is 1/sqrt(n).

$$\text{Estimation error} = 8.6 * (\text{number of tiles})^{-0.46} \quad (3)$$

As illustrated by a waveform 620, the estimated error is below 1% when the number of tiles is 1000 or more. The convergence is further illustrated for mean impact based method to determine a statistically worst case SoC leakage.

In some embodiments, the worst case leakage CDF is obtained by performing local variations Monte Carlo simulations. Alternatively, Latin Hypercube sampling (LHS) is used to obtain mean shift of the SoC leakage at each global point. LHS is a technique to generate statistical vectors from a sample space, such that in a short number of vectors the six sigma space, +/−3-sigma, can be covered. The present disclosure thus describes enabling choosing of a plurality of global points, and the calculation of the impact on leakage due to local variations at each of the global points.

Another embodiment, described further below, establishes a fundamental property of mean leakage shift at a global process point, enabling derivation of the mean leakage shift at another global process point to be derived analytically.

The mean impact of mismatch on the leakage is independent of a particular global process corner chosen. Hence, the mean impact at a strong corner is approximately similar to the mean impact at a typical process corner.

The leakage can be expressed using an expression $a*e^{kx}$, where x is the threshold voltage $V_t$, k is sensitivity of the transistor leakage to changes in threshold voltage $V_t$ which depends on the geometry of the device, and a is a function of the dimensions and other technology constants of the transistor.

The mean leakage, after taking mismatch into consideration, can be analytically derived. The global leakage is given as $y=e^{kx}$. Assuming $x_0$ is the threshold voltage at a global process corner, and delta $\Delta$ is a shift in $V_t$ around the global process corner due to mismatch:

$$\text{Mean Leakage} = \frac{1}{2\Delta} \int_{x_0-\Delta}^{x_0+\Delta} e^{kx} dx = \frac{e^{kx_0}}{2k\Delta}(e^{k\Delta} - e^{-k\Delta}) \quad (4)$$

Substituting equation (4) in equation (5), the shift in leakage can be calculated as given below:

$$\text{Shift in leakage} = \frac{\text{Mean leakage} - \text{Global leakage}}{\text{Global leakage}} \quad (5)$$

$$= \frac{\frac{e^{kx_0}}{2k\Delta}(e^{k\Delta} - e^{-k\Delta}) - e^{kx_0}}{e^{kx_0}} \quad (6)$$

$$= \frac{1}{2k\Delta}(e^{k\Delta} - e^{-k\Delta} - 2k\Delta) \quad (7)$$

The shift in leakage as given in equation (7) shows that percentage change in the leakage depends only on k and $\Delta$, as the global leakage itself is a function of $x_0$.

Figure 7:
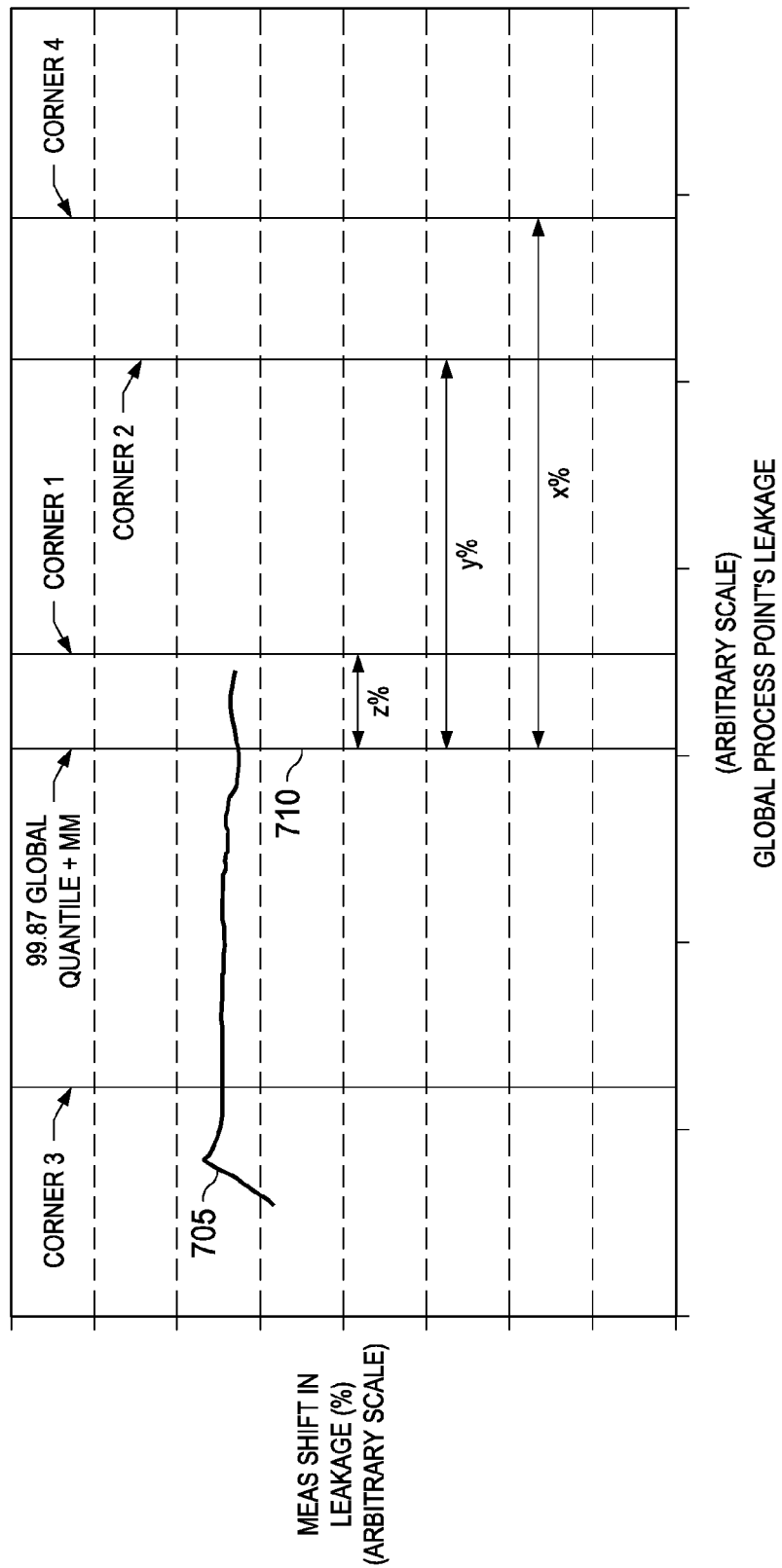
FIG. 7 is an exemplary graph for a tile level mean mismatch shift across global process points, in accordance with one embodiment.

FIG. 7 is an exemplary graph for a tile level mean MM shift across global process points, for example 1000 global process points. The graph illustrates mean shift in leakage in percentage (%) versus global process point's leakage. A waveform 705 corresponding to the mean shift remains nearly constant for an entire process space from a corner 3 to a corner 1. The process space can be defined as a process spectrum covering different variations within set bounds. A baseline 710 identifies a 99.87 statistical global quantile point with MM. FIG. 7 also illustrates corner invariance of mean shift on the tile for the entire process space from the corner 3 to the corner 1. Baselining with the 99.87 statistical global quantile point and MM shift provides the corner 1 being z % pessimistic, for example 16% pessimistic, the corner 2 being y % pessimistic, for example 64% pessimistic, and a corner 4 being x % pessimistic, for example 94% pessimistic, as compared to the baseline 710. Pessimistic can be defined as over-prediction of the leakage at a corner, for example the corner 1, the corner 2, the corner 3, and the corner 4.

Hence, the corner invariance of the mean shift in the leakage can be efficiently used to arrive at the leakage CDF. In addition, each global process point in a leakage space can effectively see similar shift in leakage due to the local variations. The leakage space can be defined as a spectrum. The leakage space can also be inferred as a leakage graph where an X-axis is a global process point. Further, each process point on the global leakage CDF can be shifted similarly, to arrive at a final leakage CDF.

Figure 8:
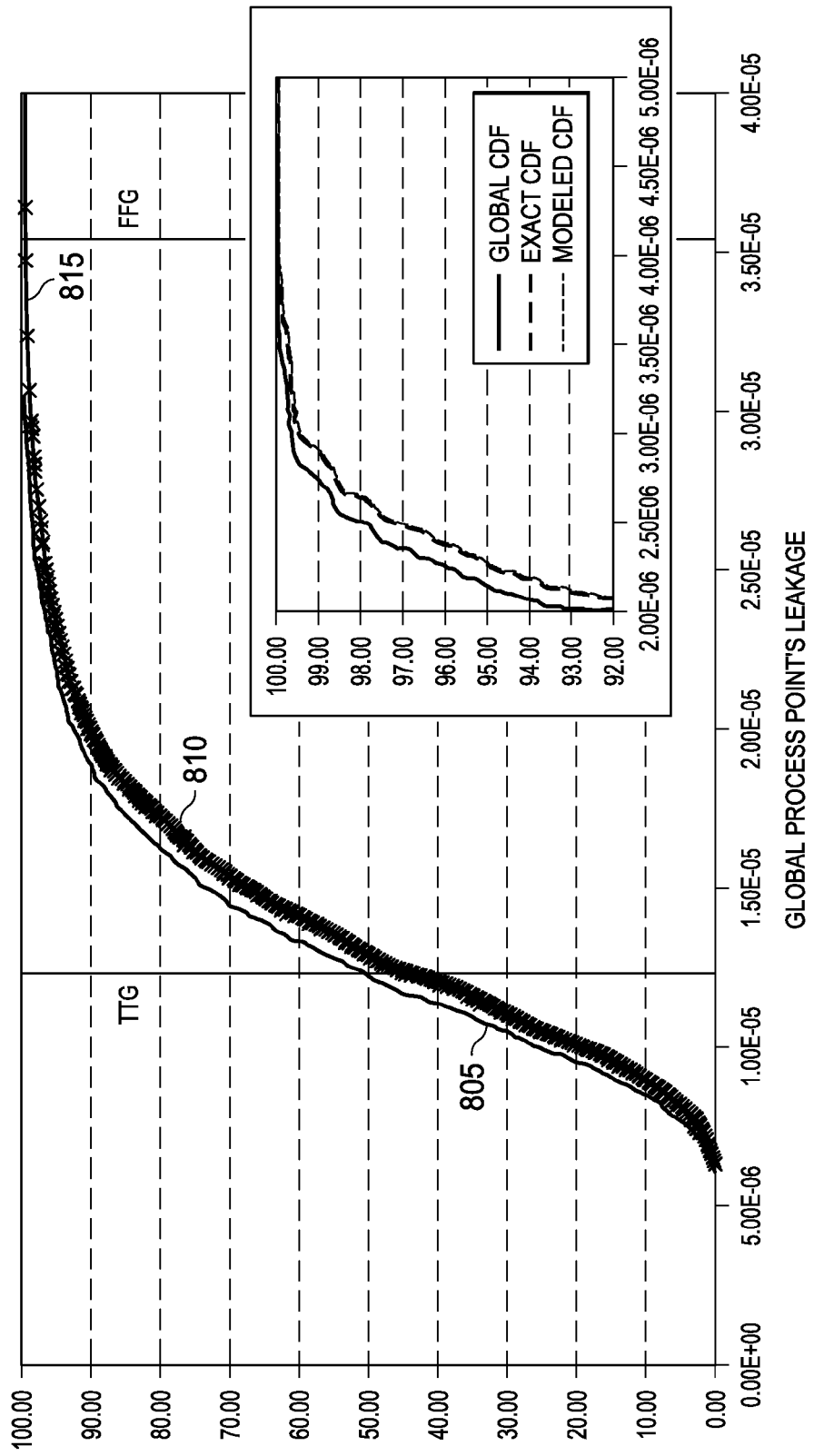
FIG. 8 is an exemplary graph illustrating a comparison of a global leakage cumulative distribution function (CDF), an exact leakage CDF, and a modeled leakage CDF considering local variations, in accordance with one embodiment.

FIG. 8 is an exemplary graph illustrating a comparison of the global leakage CDF, an exact leakage CDF, and a modeled leakage CDF considering the local variations. A waveform 805 corresponds to the global leakage CDF, a waveform 810 corresponds to the exact leakage CDF, and a waveform 815 corresponds to the modeled leakage CDF. The exact leakage CDF is based on local Monte Carlo simulations at each global process point. FIG. 8 includes an inset graph 820 with additional details from 2.00E-05 global process point's leakage and higher. FIG. 8 further highlights overlay of modeled and determined CDF with actual and exact CDF obtained through simulations at each global process point.

Figure 9:
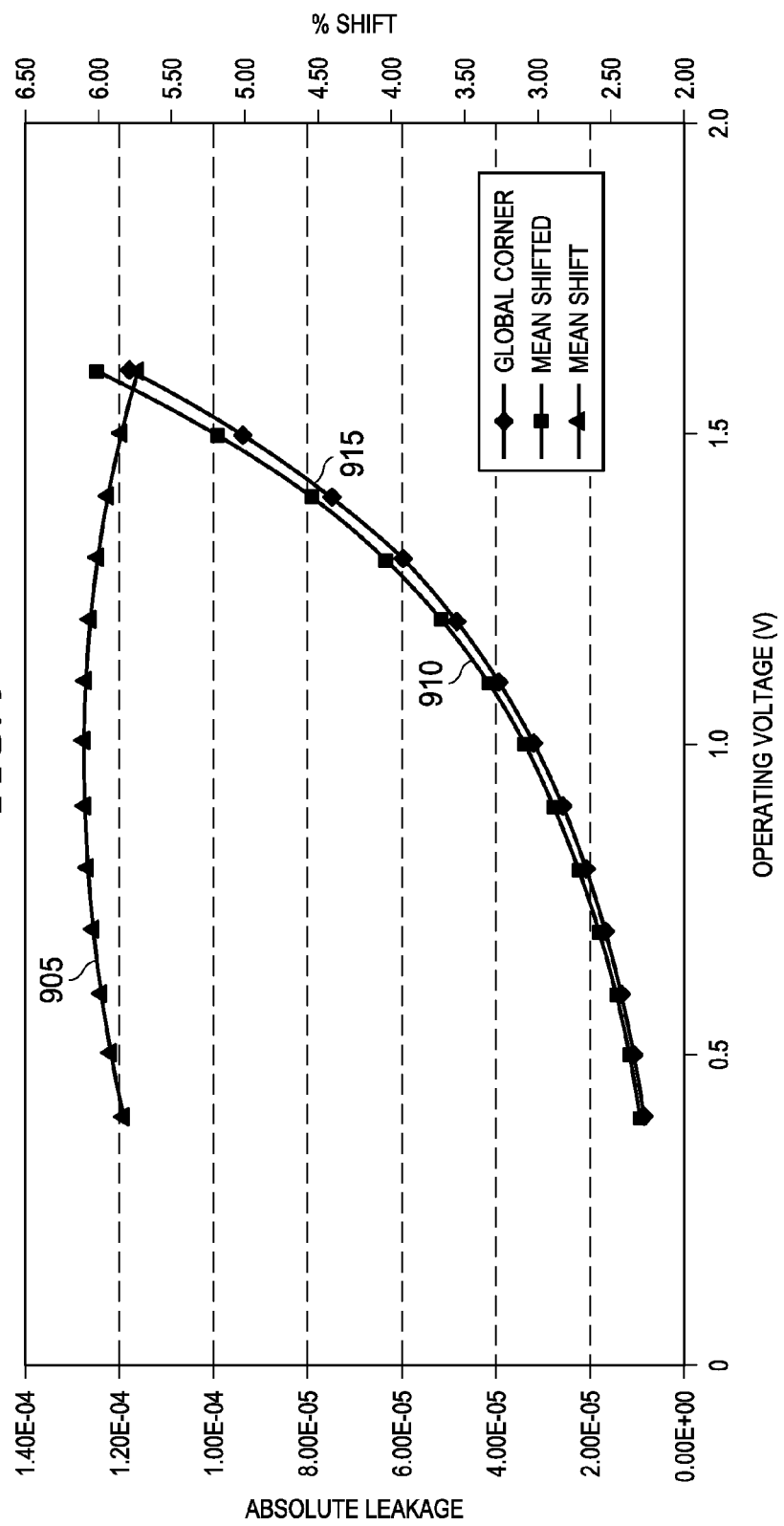
FIG. 9 is an exemplary graph illustrating the mean shift in leakage with operating voltage, in accordance with one embodiment.

FIG. 9 is an exemplary graph illustrating the mean shift in leakage with operating voltage. A global corner CDF 915 is shown along with a mean shifted CDF 910 after the mean shift is applied to the global corner CDF. A waveform 905 corresponds to the mean shift in leakage and illustrates invariance of the mean shift leakage to the operating voltage.

Figures 10, 11:
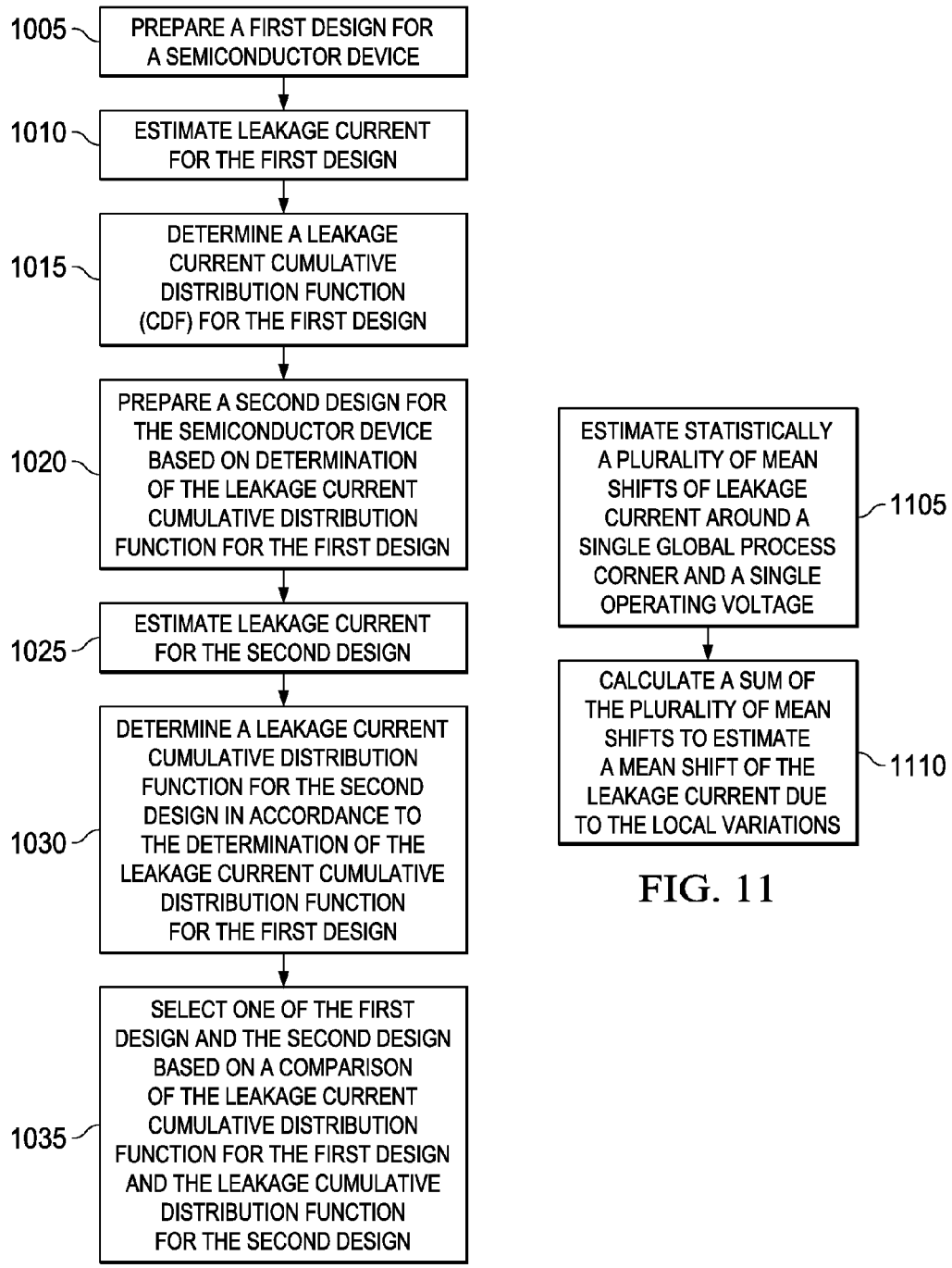
FIG. 10 is a flowchart illustrating a method of designing a semiconductor device, in accordance with one embodiment.
FIG. 11 is a flowchart illustrating a method of estimating effects of local variations on leakage current for a semiconductor device, in accordance with one embodiment.

FIG. 10 is a flowchart illustrating a method of designing a semiconductor device.

At step 1005, a first design is prepared for the semiconductor device, for example a system on chip (SoC).

At step 1010, leakage current is estimated for the first design. The leakage current is estimated by statistically characterizing a mismatch impact on leakage for each cell of a plurality of cells of the semiconductor device through a number of simulations, for example Monte Carlo simulations, applied to a reduced sample set. Mean of the mismatch impact for each cell is then added. The leakage current is further generated for the semiconductor device.

In some embodiments, the number of simulations can be reduced. In one example a sampling method, Latin Hypercube Sampling (LHS), can be further used to reduce the number of Monte Carlo simulations.

At step 1015, a leakage current cumulative distribution function (CDF) is determined for the first design. The determination of the leakage CDF is given below.

A plurality of mean shifts of leakage current and a sum of the plurality of mean shifts is calculated. Each mean shift of the mean shifts is around a single global process corner and a single operating voltage. Each mean shift is further invariant of the operating voltage. The single global process corner includes a corner exhibiting one of desired performance and undesired leakage.

In some embodiments, only the mean shifts of leakage current are calculated. Each mean shift is around a plurality of global process corners and a plurality of operating voltages to obtain a local variation mean shift. The global process corners can range from five to ten global process corners.

The leakage current at a plurality of global process points and at a plurality of operating voltages is then calculated to obtain a global leakage current CDF.

Each leakage current on the global leakage current CDF is further shifted by the sum of the mean shifts to obtain the leakage current CDF for the first design considering both global variations and local variations and for the operating voltages.

In some embodiments, each leakage current on the global leakage current CDF is shifted by the local variation mean shift. The local variation mean shift can be obtained by linear approximation, for example piecewise linear approximation.

At step 1020, a second design is prepared for the semiconductor device based on determination of the leakage current CDF for the first design.

At step 1025, leakage current is estimated for the second design. The leakage current for the second design is estimated by statistically characterizing a mismatch impact on leakage for each cell of a plurality of cells of the semiconductor device through a number of simulations, for example Monte Carlo simulations, applied to a reduced sample set. Mean of the mismatch impact for each cell is then added. The leakage current is further generated for the semiconductor device.

At step 1030, a leakage current CDF is determined for the second design in accordance to the determination of the leakage current CDF for the first design.

At step 1035, one of the first design and the second design is selected based on a comparison of the leakage current CDF for the first design and the leakage CDF for the second design. The selection is performed by calculating a performance CDF and tradeoffs between leakage and performance. The selection further enables a tradeoff analysis between leakage and performance using the leakage current CDF in conjunction with a performance CDF.

The semiconductor device is further manufactured according to one of the first design and the second design.

FIG. 11 is a flowchart illustrating a method of estimating effects of local variations on leakage current for a semiconductor device.

At step 1105, a plurality of mean shifts of leakage current are statistically estimated around a single global process corner and a single operating voltage. The estimating includes statistical modeling of a mismatch impact on leakage for each cell of the semiconductor device through a plurality of simulations applied to a reduced sample set. In one example, the simulations can be Monte Carlo simulations and the reduced sample set includes lesser than 1500 samples.

At step 1110, a sum of the mean shifts is calculated to estimate a mean shift of the leakage current due to the local variations. The local variations for the leakage current are determined based on a mean around the single global process corner.

The estimation of the leakage current accounts for both local variations and global variations and provides better accuracy in results.

The foregoing description sets forth numerous specific details to convey a thorough understanding of embodiments of the disclosure. However, it will be apparent to one skilled in the art that embodiments of the disclosure may be practiced without these specific details. Some well-known features are not described in detail in order to avoid obscuring the disclosure. Other variations and embodiments are possible in light of above teachings, and it is thus intended that the scope of disclosure not be limited by this Detailed Description, but only by the Claims.

What is claimed is:

1. A machine-implemented method of designing a semiconductor device, the method comprising:
   preparing a first design for the semiconductor device;
   estimating leakage current for the first design;
   determining, using a processor, a leakage current cumulative distribution function (CDF) for the first design by:
      calculating a plurality of mean shifts of leakage current and a sum of the plurality of mean shifts, each mean shift of the plurality of mean shifts is calculated around a single global process corner and a single operating voltage;

calculating the leakage current at a plurality of global process points and at a plurality of operating voltages to obtain a global leakage current CDF; and shifting each leakage current on the global leakage current CDF by the sum of the plurality of mean shifts to obtain the leakage current CDF for the first design considering both global variations and local variations and for the plurality of operating voltages;

preparing a second design for the semiconductor device based on determination of the leakage current CDF for the first design;

estimating leakage current for the second design;

determining a leakage current CDF for the second design in accordance to the determination of the leakage current CDF for the first design; and selecting one of the first design and the second design based on a comparison of the leakage current CDF for the first design and the leakage CDF for the second design.

2. The method as claimed in claim 1, wherein estimating the leakage current comprises:

statistically characterizing a mismatch impact on leakage for each cell of a plurality of cells of the semiconductor device through a number of simulations applied to a reduced sample set;

adding mean of the mismatch impact for each cell of the plurality of cells; and generating the leakage current for the semiconductor device.

3. The method as claimed in claim 2 and further comprising reducing the number of simulations.

4. The method as claimed in claim 3, wherein a sampling method is used to reduce the number of simulations.

5. The method as claimed in claim 3, wherein each mean shift of the plurality of mean shifts of the leakage current is invariant of the operating voltage.

6. The method as claimed in claim 5, wherein the single global process corner comprises a corner exhibiting one of desired performance and undesired leakage.

7. The method as claimed in claim 6, wherein selecting one of the first design and the second design further comprises calculating a performance CDF, and tradeoffs between leakage and performance.

8. The method as claimed in claim 7 and further comprising manufacturing the semiconductor device according to one of the first design and the second design.

9. The method as claimed in claim 1, wherein the semiconductor device comprises a system-on-chip.

10. A machine-implemented method of designing a semiconductor device, the method comprising:

preparing a first design for the semiconductor device;

estimating leakage current for the first design;

determining, using a processor, a leakage current cumulative distribution function (CDF) for the first design by:

calculating a plurality of mean shifts of leakage current, each mean shift of the plurality of mean shifts is calculated around a plurality of global process corners and a plurality of operating voltages to obtain a local variation mean shift;

calculating the leakage current at a plurality of global process points and at the plurality of operating voltages to obtain a global leakage current CDF; and shifting each leakage current on the global leakage current CDF by the local variation mean shift to obtain the leakage current CDF for the first design considering both global variations and local variations and for the plurality of operating voltages;

preparing a second design for the semiconductor device based on determination of the leakage current CDF for the first design;

estimating leakage current for the second design;

determining a leakage current CDF for the second design in accordance to the determination of the leakage current CDF for the first design; and selecting one of the first design and the second design based on a comparison of the leakage current CDF for the first design and the leakage CDF for the second design.

11. The method as claimed in claim 10, wherein estimating the leakage current comprises:

statistically characterizing a mismatch impact on leakage for each cell of a plurality of cells of the semiconductor device through a number of simulations applied to a reduced sample set;

adding mean of the mismatch impact for each cell of the plurality of cells; and generating the leakage current for the semiconductor device.

12. The method as claimed in claim 11, wherein the local variation mean shift is obtained by linear approximation.

13. The method as claimed in claim 11, wherein the plurality of global process corners ranges from five to ten global process corners.

14. The method as claimed in claim 11, wherein the semiconductor device comprises a system-on-chip.

15. The method as claimed in claim 11, wherein selecting one of the first design and the second design further comprises enabling a tradeoff analysis between leakage and performance using the leakage current CDF in conjunction with a performance CDF.

16. The method as claimed in claim 11 and further comprising manufacturing the semiconductor device according to one of the first design and the second design.

17. A machine-implemented method of estimating effects of local variations on leakage current for a semiconductor device, the method comprising:

statistically estimating a plurality of mean shifts of leakage current around a single global process corner and a single operating voltage; and calculating, using a processor, a sum of the plurality of mean shifts to estimate a mean shift of the leakage current due to the local variations, the local variations for the leakage current being determined based on a mean around the single global process corner.

18. The method as claimed in claim 17, wherein statistically estimating the plurality of mean shifts comprises statistically modeling a mismatch impact on leakage for each cell of the semiconductor device through a plurality of simulations applied to a reduced sample set.

19. The method as claimed in claim 18, wherein the plurality of simulations are Monte Carlo simulations.

20. The method as claimed in claim 18, wherein the reduced sample set comprises lesser than 1500 samples.

* * * * *